De V. WOOD.
AIR-COMPRESSOR.
No. 180,443. Patented Aug. 1, 1876.
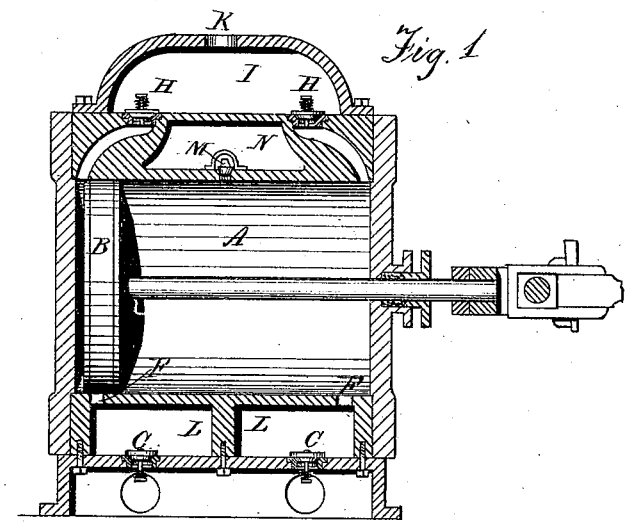
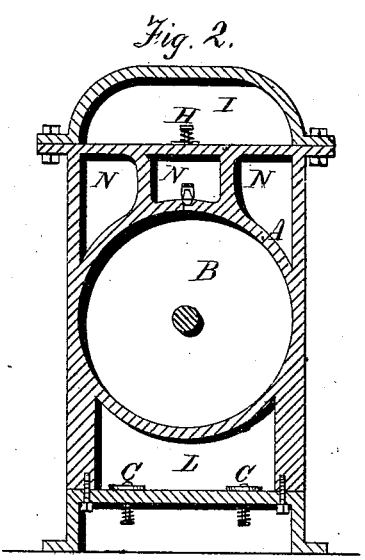
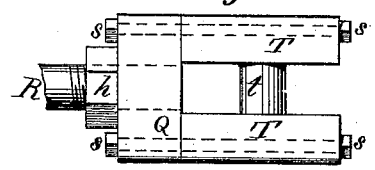
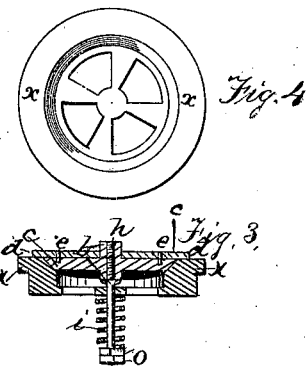
Witnesses
Grenville Lewis
M. Church
Inventor,
De Volson Wood
By — Hill, Ellsworth Spear
His Atty

UNITED STATES PATENT OFFICE.

DE VOLSON WOOD, OF HOBOKEN, NEW JERSEY.

IMPROVEMENT IN AIR-COMPRESSORS.

Specification forming part of Letters Patent No. 180,443, dated August 1, 1876; application filed May 20, 1876.

*To all whom it may concern:*

Be it known that I, DE VOLSON WOOD, of the city of Hoboken, county of Hudson, and State of New Jersey, have invented certain Improvements in Air-Compressors, of which the following is a specification:

My invention pertains to the arrangement and construction of certain details in horizontal engines for compressing air, which is to be used for driving other machines, or to do mechanical work.

In the accompanying drawings, which form a part of this specification, Figure 1 is a longitudinal section of the machine. Fig. 2 is a cross-section of the same. Fig. 3 is a section of the induction-valve. Fig. 4 is a plan of the valve-seat. Fig. 5 is a plan and end view of the cross-head.

A is a horizontal cylinder, in which reciprocates the piston B. As the piston moves to and fro it tends to make a vacuum in the cylinder at the end from which it recedes, and causes the external air to rush through the valves C C into the cylinder, and thus fills one end of the cylinder, while the air in the other end is forced out through the valves H H into an air-chamber, I, from which it is conducted through the passage K to do the work intended.

In compressing air heat is always developed; but for the sake of economy, as well as for the protection of the piston and cylinder, the temperature should be kept as low as possible, to accomplish which water is applied to the outside of the cylinder, and small quantities are admitted into it. A space, N, above the cylinder and below the air-chamber I, is kept constantly full of water in any convenient manner, and a small quantity passes through the puppet-valves M directly into the cylinder with each stroke; but the valve M automatically closes as the piston returns, so as to prevent the air in the cylinder from escaping through it.

In horizontal compressors the induction-valves are usually placed in the heads of the cylinder, and open and close by moving horizontally. They are forced to their seat by a spring, and also by the pressure of the air as the piston returns. In this way the valve strikes the seat with much force, and the shock causes the valve-stem $h\ i$, Fig. 3, to break, and the body of the valve C drops into the cylinder, and as the piston returns, it jams against it and often produces serious damage. Also, when the seats are worn so that the valve leaks, it is not easy for an ordinary mechanic to repair them.

I have sought to make a valve which can be easily repaired, and which is not liable to break. This is shown in Fig. 3. $c\ c$ is a solid disk of brass or other suitable material, having a conical bearing on its seat and a hub, $b\ b$. The disk is thin, so as to be light; but the hub is comparatively long, so as to give a good bearing to the valve-stem $h\ i$. The stem $h\ i$ is considerably enlarged where it passes through the hub, so that it will not be weakened by the thread which is cut upon it, and so that it will not be liable to break where it joins the hub. On the inside of the valve is a rubber disk, $d\ d$, which is secured to the disk by means of rivets $e\ e$, or in any other suitable manner. The rubber extends beyond the disk $c\ c$, and rests against the plane surface $x\ x$ of the valve-seat, so as to form an air-tight joint all around the valve. The conical seat $c\ c$ forms a secondary seat.

The rubber disk can be replaced at any time. The rubber should come upon its seat before the metallic part $c\ c$ reaches its seat, so as to break the force of the blow, and, as far as possible, prevent shock. O are check-nuts, against which the spring bears in closing the valves. The rubber is placed on the inside of the valve, so that the pressure of the air will have but little tendency to crush it.

In some cases I place the induction-valves C C, Fig. 1, in a chamber below the cylinder, so that in case of breakage they cannot cause damage to any other part of the machine. In this case they move upward to open, and downward to close, in the well-known way. The space L L, which contains the induction-valves, communicates with the cylinder through the passage F, which enters the cylinder a short distance from the end, so that the piston will pass it, and thus shut off the passage and prevent the escape through it of the air which is being compressed. Water is supplied to the cylinder, as before described, and fills the space L. When air rushes through the valve C it will take a portion of the water with it; but as the piston returns, the water will immediately return to this space, thus forcing all of the air into the cylinder before the piston passes the passage F. The valve-seat is of the well-known form, as shown in Fig. 4. The cross-head, Fig. 5, is made in two parts, P P and Q Q, which are of cast-iron, and which are bolted together by wrought bolts S S.

This arrangement secures a good material for resisting compression, and the best material for resisting tension; but one of the chief objects is to enable the mechanic to fit up the parts with the ordinary tools of the shop, especially that of turning the wrist-pin $t$ in the lathe without difficulty, and at the same time make a cheap and durable cross-head.

The piston-rod R is secured to the cross-piece Q Q in any suitable manner; but as the piston B, Fig. 1, should work very close to the cylinder-heads at the ends of the stroke, it is desirable to preserve a constant length between the piston and driving mechanism. To aid in this adjustment I screw the rod R into the cross-piece Q, and secure it in position by means of a check-nut, $h$. The piston B is driven by any suitable mechanism, which is not here shown, but which is attached to the wrist T.

Having described my invention, I claim as new—

1. The water-space N, arranged between the cylinder A and air-chamber I, and from which water is admitted into the cylinder A, substantially as described.

2. The combination of the valve $c$, rubber flap $d$, valve-stem $h$ $i$, and the springs and nut, as set forth.

3. An air-compressor composed of the water-space N, valve M, cylinder A, piston B, chambers L L, valves C C, and openings F F, all operating in connection with the other parts, as set forth.

DE VOLSON WOOD.

Witnesses:
M. CHURCH,
A. MOORE.